Figure 1:
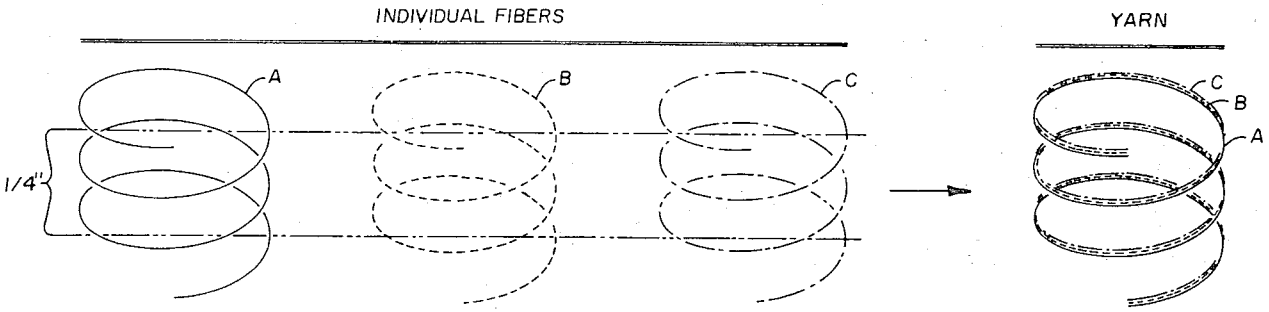
Figure 2:
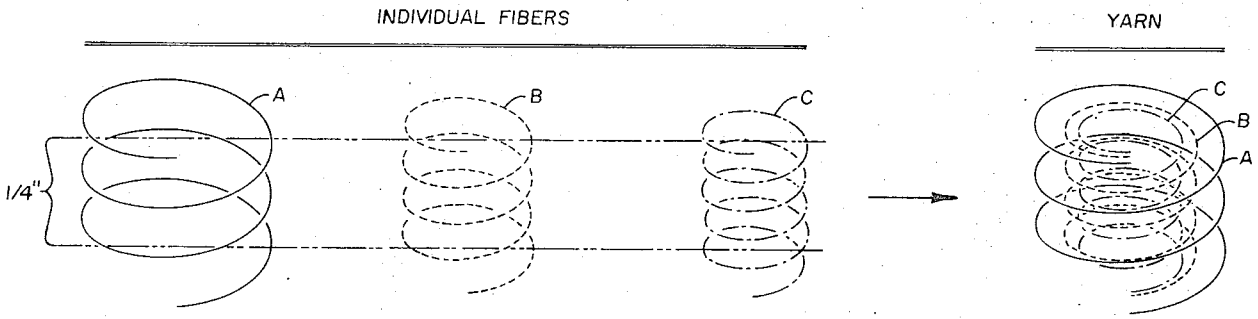
Figure 3:
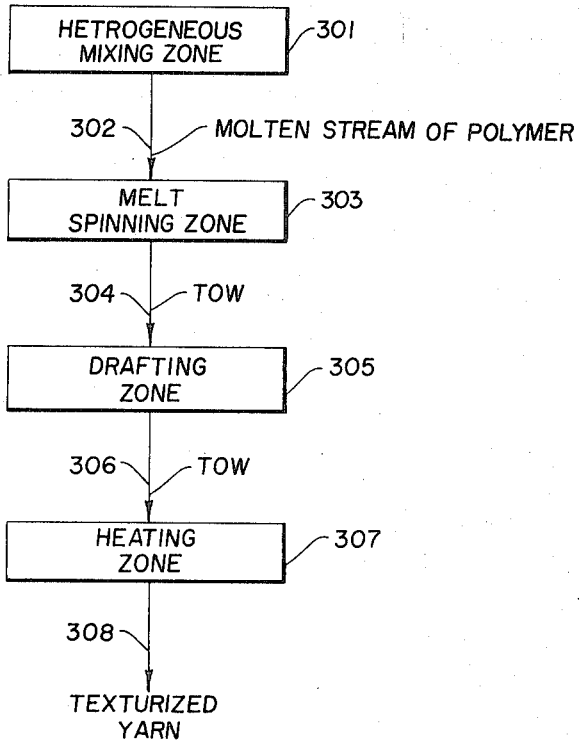
Figure 4:
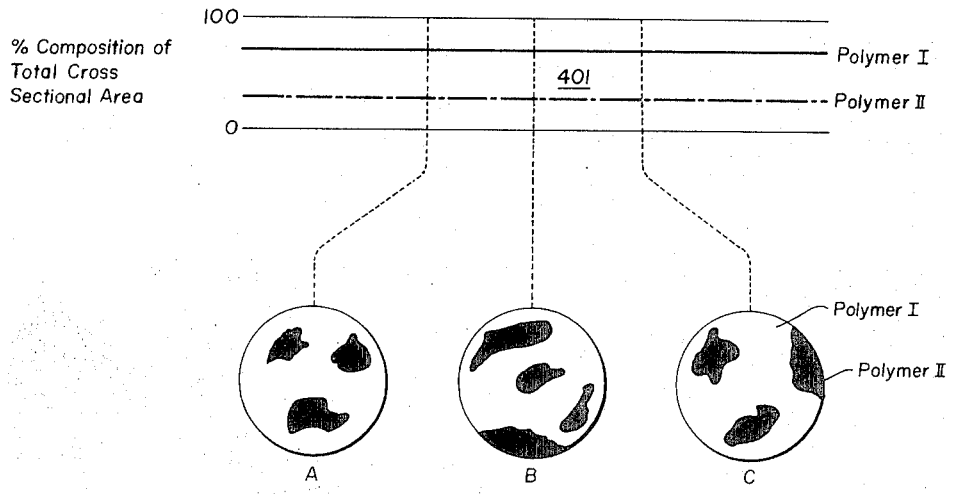
Figure 5:
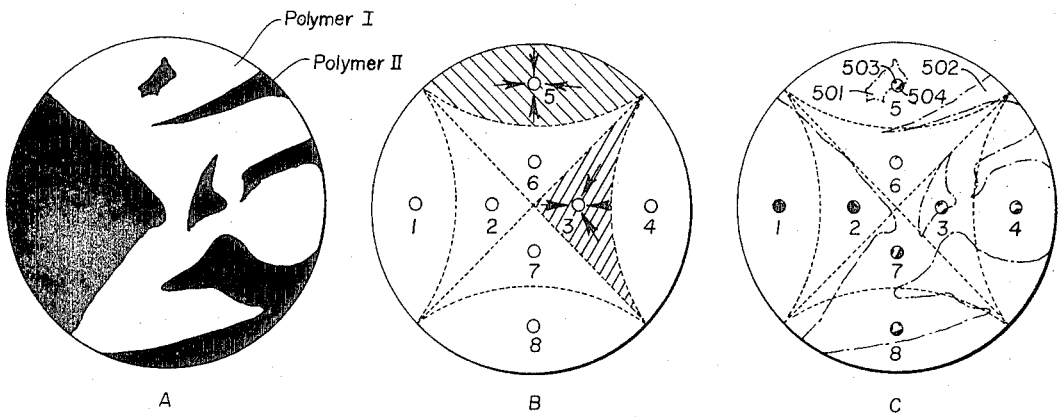
Figure 6:
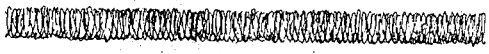
Figure 7:
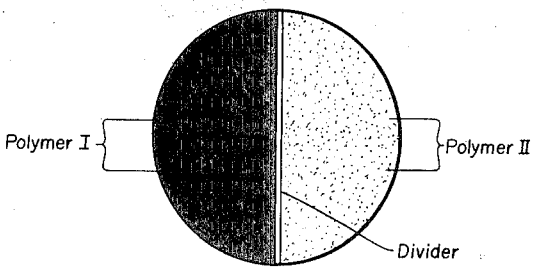
Figure 7:
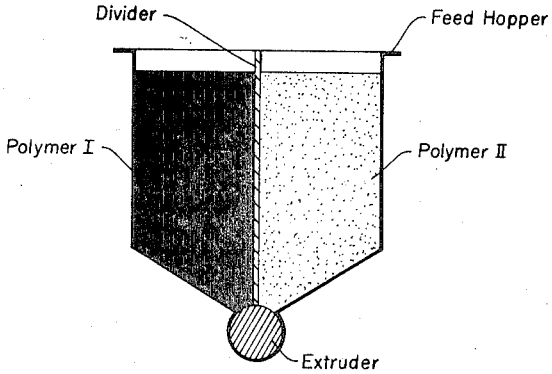
Figure 8:
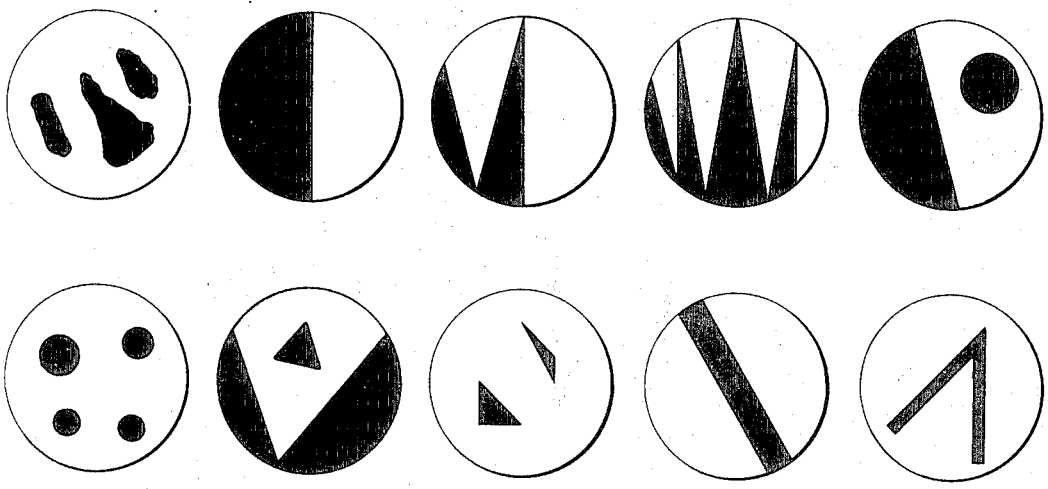
Figure 9:
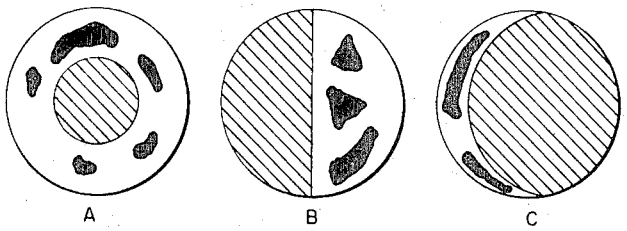
Figure 10:
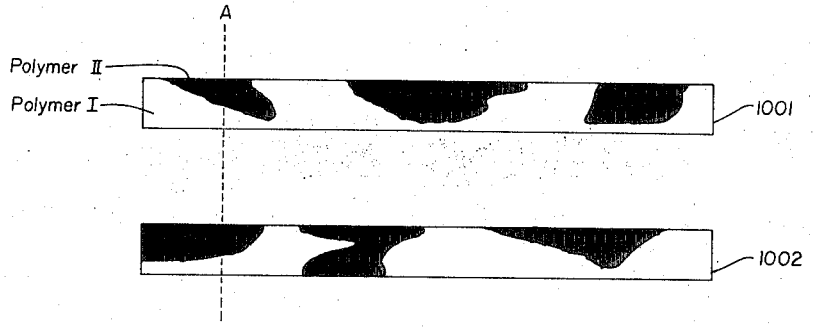
Figure 11:
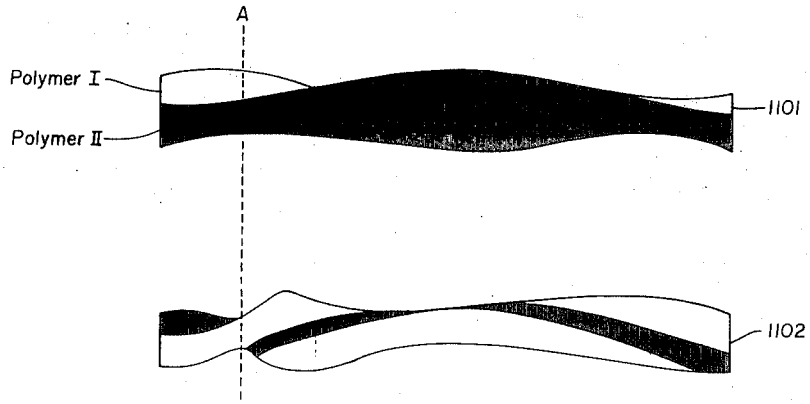

DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED OCTOBER 10, 1972

903 O.G. 373

T903,029
PROCESS FOR PRODUCING TEXTURIZED YARN

Bobby M. Phillips, 124 Bloomingdale Pike, Kingsport, Tenn. 37662

Filed June 3, 1971, Ser. No. 149,575
Int. Cl. D01d *5/22*
U.S. Cl. 264—168
6 Sheets Drawing. 28 Pages Specification

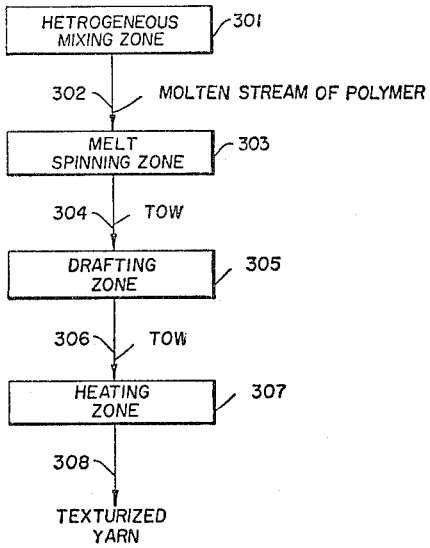

A texturized yarn is produced by the steps of forming a molten stream of polymer of a heterogeneous mixture of a first polymer and a second polymer having a shrinking characteristic different than the first polymer, melt spinning a tow from the molten stream of polymer, drafting the melt spun tow, and heating the drafted tow at self crimping conditions to produce a texturized yarn. The molten stream of polymer is formed by continuously withdrawing a portion of a first polymer from a vertically confined source of the polymer, continuously withdrawing from a vertically confined source of the polymer a portion of a second polymer having a shrinkage characteristic different than the first polymer, and continuously introducing the withdrawn portions of the first and second polymer into a heterogeneous mixing zone adapted to heterogeneously mix the first and second polymers and discharge a molten stream of a heterogeneous mixture of the first polymer and the second polymer. The texturized yarn of this invention is characterized by a cross section of a plurality of helically crimped bicomponent melt spun textile fibers which have a suitable distribution of crimping characteristics at a cross section of the yarn to produce a texturized yarn and the yarn is further characterized as having a uniform texturized character along the longitudinal axis of the yarn.

PROCESS FOR PRODUCING TEXTURIZED YARN

Filed June 3, 1971 6 Sheets-Sheet 1

BOBBY M. PHILLIPS
INVENTOR.

BY

ATTORNEY

PROCESS FOR PRODUCING TEXTURIZED YARN

Filed June 3, 1971 6 Sheets-Sheet 2

BOBBY M. PHILLIPS
INVENTOR.

BY

ATTORNEY

PROCESS FOR PRODUCING TEXTURIZED YARN

Filed June 3, 1971 6 Sheets-Sheet 3

BOBBY M. PHILLIPS
INVENTOR.

BY Charles R. Martin

ATTORNEY

PROCESS FOR PRODUCING TEXTURIZED YARN

Filed June 3, 1971 6 Sheets-Sheet 4

BOBBY M. PHILLIPS
INVENTOR.

BY Chester L. Marsten

ATTORNEY

PROCESS FOR PRODUCING TEXTURIZED YARN

Filed June 3, 1971 6 Sheets-Sheet 5

BOBBY M. PHILLIPS
INVENTOR.

BY Charles R. Martin

ATTORNEY

PROCESS FOR PRODUCING TEXTURIZED YARN

Filed June 3, 1971 6 Sheets-Sheet 6

BOBBY M. PHILLIPS
INVENTOR.

BY Charles R. Martin

ATTORNEY